United States Patent Office 3,642,675
Patented Feb. 15, 1972

3,642,675
GLARE-FREE COATING COMPOSITIONS COMPRISING HOLLOW MICROSPHERES AND SOLID CRUSH-RESISTANT PARTICLES
Eugene L. McKenzie, 2501 Hudson Road,
North St. Paul, Minn. 55109
Filed Sept. 2, 1970, Ser. No. 68,852
Int. Cl. C09d 3/26, 3/64, 5/22
U.S. Cl. 260—22 A
4 Claims

ABSTRACT OF THE DISCLOSURE

A coating composition for forming paint-like films that have lasting glare-free properties. The coating composition includes a liquid, film-forming vehicle, and two types of flattening agent particles: (1) hollow microspheres and (2) smaller, solid, crush-resistant particles that prevent an object that is scraped or rubbed against an applied film of the composition from totally collapsing or crushing the hollow microspheres.

---

Conventional flat paint compositions—which form paint films having an optionally "flat" or glare-free appearance—generally include a high loading of a rather rigid particulate flatting agent such as silica, diatomaceous earth, or the like, which uniformly roughen the surface of the film. The films formed from such conventional flat paint compositions are susceptible to marking when an object is scraped or rubbed against them because the scraping or rubbing action removes or crushes some of the rigid flatting agent particles that form the surface projections in the film. With the flatting agent particles wholly or partially removed, a scratch or burnish mark is left that makes the paint film unsightly. And after a long period of scrubbing, washing, or wear, a large area of a conventional flat paint film may be reduced to a semigloss appearance.

The present invention provides coating compositions for providing glare-free paint-like films that remain glare-free even after an object is scraped or rubbed over them. These coating compositions include, first, a liquid vehicle, which includes a film-forming organic binder and forms a nontacky, adherent, durable film when applied as a thin layer on a substrate and exposed to a predetermined environment. To this paint vehicle are added two types of flattening agent particles, that is, particles that are inert and noncoalescing in the composition so that they become uniformly dispersed in an applied film of the composition and uniformly roughen the surface of the film; (1) hollow microspheres dispersed in the vehicle in an amount sufficient to uniformly roughen the surface of an applied film of the composition and reduce glare from the film; and (2) solid, crush-resistant particles having an average diameter less than the average diameter of the hollow microspheres and present in an amount sufficient to protect a substantial proportion of the hollow microspheres against total crushing under abrasion of the film. Preferably, the hollow microspheres are made of glass, and the solid particles are solid glass microspheres.

When a film of a coating composition of this invention is scraped or rubbed, some of the hollow microspheres forming the projections in the surface of the film may be crushed, but they are crushed only to a depth established by the diameter of the solid crush-resistant particles. With only a top portion of the hollow microspheres removed, surface irregularities remain in the film in the form of cavities formed by the interior of the hollow microspheres, and these surface irregularities continue to make the surface of the film glare-free.

DETAILED DESCRIPTION

Figure 1:
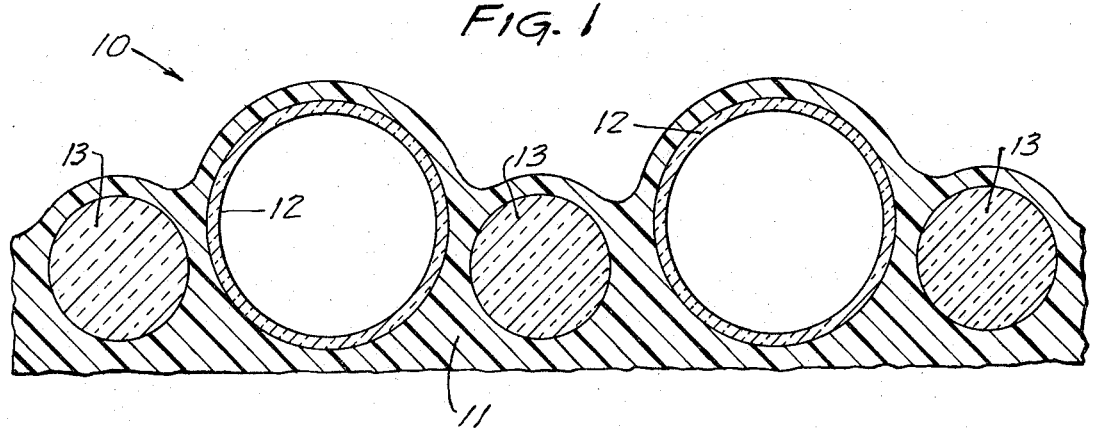
Figure 2:
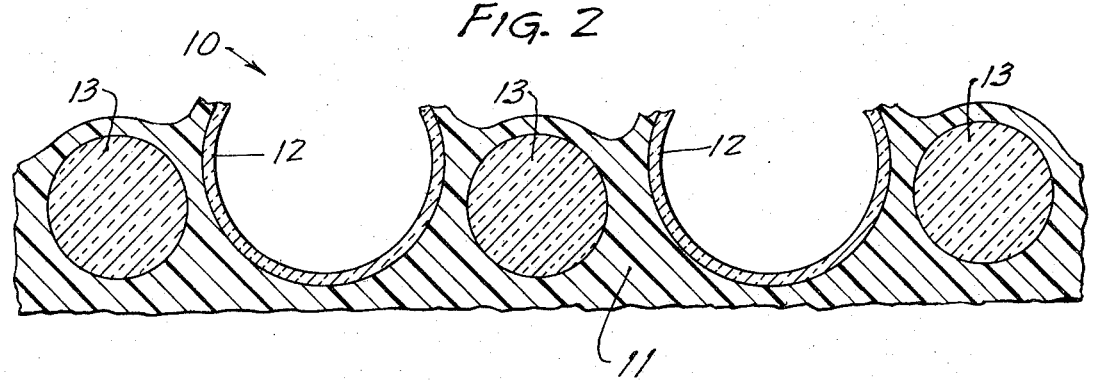

The way in which a film of the invention remains glare-free is illustrated in the drawings. FIG. 1 shows a top portion of a paint-like film 10 of the invention comprising a film matrix 11 in which are dispersed hollow glass microspheres 12 and solid glass microspheres 13, the latter having a diameter approximately half the diameter of the hollow microspheres. When the film 10 is scraped, rubber, or sanded, only the top portions of the hollow microspheres 12 tend to be removed, as shown in FIG. 2, because the solid, crush-resistant, glass microspheres 13 prevent the scraping, rubbing, or sanding object from digging into the film 10 deep enough to remove all or substantially all of each hollow microsphere struck.

The drawings are an idealized view, since the hollow microspheres and solid microspheres are usually not a single size as shown. Further, these flatting agent particles are not present as a monolayer, but, at any point, particles are usually piled on top of one another. As a result, spherical indentations will continue to be formed if the film is worn or otherwise reduced to a lesser thickness.

The vehicle for coating compositions of the invention, which may be defined as the liquid portion of the compositions, comprises a film-forming organic binder and, almost always, a volatile thinner in which the binder is dissolved or dispersed. Generally at least 5 volume-percent of the vehicle is film-forming binder. The vehicle forms a nontacky, adherent, durable film when applied as a thin layer on a substrate and exposed to a predetermined environment—often a normal ambient environment (temperatures of about 40° F. to 110° F.) but sometimes including extreme temperatures or other conditions, such as when the film is finished in a baking oven. The film-forming binder in the vehicle may be selected from a wide variety of binders depending on the job for which the coating composition is to be used and the properties desired in the final film matrix. For example, the binder may form films having various degrees of rigidity or elasticity, rates of drying or curing, or different characteristics of durability, appearance, or application methods. The binder may include two reactive parts that are mixed just prior to application. To make the film more mark-resistant, binders that form a very hard, rigid film or binders that form tough elastomeric films may be used. Some illustrative binders are drying oils and resin-modified drying oils, alkyds, polyurethanes, epoxy resins, ureas, and allyls.

The hollow microspheres incorporated in a coating composition of the invention are usually made of glass, but hollow microspheres made of other materials are also useful in compositions of the invention. The microspheres are generally at least about 3 microns in diameter and less than about 150 microns in diameter to provide the desired uniform, minute roughening of the final film surface. (By diameter is meant the largest dimension of the particles, such as the principal axis of a sphere.) Preferably the particles are at least 25 microns in diameter to avoid glossiness in an applied film if small particles flood one area of the film. The hollow microspheres are included in an amount sufficient to roughen the surface of an applied film of the composition and reduce glare from the film. That amount usually constitutes at least about 10 volume-percent of the solids (the nonvolatile materials that constitute an applied film) in a composition of the invention, but usually does not exceed about 65 volume-percent of the solids in the composition; however, higher amounts may be used (up to about 80 volume-percent) depending on the use that is to be made of the composition.

The solid crush-resistant particles in a composition of the invention are usually solid glass microspheres or beads, but inert, noncoalescing, crush-resistant particles of other materials are also useful, and it is not essential that the particles be spherical. As previously noted, these solid particles have the function of assuring that the hollow microspheres are not wholly crushed, but crushed only to a depth that creates a suitable surface irregularity. Preferably, a substantial number of the hollow microspheres are crushed to a point that is between about three-fourths and one-fourth of their diameter, and the solid crush-resistant particles in a composition of the invention usually have an average diameter that is between about three-fourths and one-fourth of the average diameter of the hollow microspheres. Ideally, the average diameter of the solid crush-resistant particle is about one-half the average diameter of the hollow microspheres. The solid crush-resistant particles are generally between 3 and 150 microns in diameter, and their average diameter is preferably more than 15 microns, to provide the desired degree of roughening in an applied film.

While coloring pigments or other coloring agents are generally included in a composition of the invention in an amount sufficient to color and usually to opacify an applied film, the hollow microspheres or solid particles may also be used to provide color in an applied film of the invention. Also, coloring agents may be wholly omitted from a composition of the invention. And in some compositions of the invention the hollow microspheres may be coated with a reflective material such as aluminum so that the spherical indents formed when the top portion of the hollow microspheres is broken away are retro-reflective. Solid glass microspheres may also be hemispherically coated with reflective material to provide retro-reflectivity when they become exposed. Most typically, however, the hollow microspheres and solid particles are transparent and may be added to a colored vehicle without affecting the color of the complete coating composition.

The pigments included are usually much smaller than 3 microns in diameter. It should also be noted that, as a practical matter, many commercial lots of hollow glass microspheres contain a minor fraction of small solid glass microspheres which were intended to become hollow microspheres but did not. These solid glass microspheres have average diameters much smaller than 15 microns, and while they do not assist in establishing a depth for crushing of the hollow microspheres, they do not detract significantly from the properties of an applied film of a coating composition of the invention. Various other additives may also be included in the composition, such as driers, reinforcing pigments, fillers, and thixotropic and flow-controlling agents.

Compositions of the invention may be applied by various methods, including spraying, brushing, or other coating techniques. After application and after formation of a dry film, the film may be treated or modified to arrive at the desired finished condition. For example, an applied film of the invention may be sanded or buffed and then coated with wax for exterior finishes on automobiles.

The invention will be further illustrated by describing an exemplary coating composition of the invention, which includes the following ingredients:

|  | Parts by volume |
|---|---|
| Automobile enamel comprising a medium-oil alkyd resin dissolved in a mixture of xylol, V.M & P. naphtha, and butanol with a pigment loading of 15 volume-percent of the solids (total solids 50 volume-percent) | 68 |
| Hollow glass spheres ranging from 20 to 90 microns in diameter, averaging (on a volume basis) 40 microns in diameter, and having an average specific gravity of about 0.28 | 26 |
| Transparent, clear glass beads ranging from 18 to 40 in diameter, averaging (on a weight basis) 29 microns in diameter, and having an average specific gravity of about 2.5 | 6 |

The composition is mixed together and then sprayed onto a flat primed metal panel and baked in a manner conventional for applying automotive finishes, producing a dry film about 8 mils in thickness. When scraped or rubbed under moderate pressure with a stylus or sandpaper, the finished film remains glare-free to a much greater degree than conventional flat paints do.

What is claimed is:
1. A coating composition for preparing lastingly glare-free paint-like films comprising
   (A) a paint vehicle;
   (B) inert noncoalescing hollow microspheres dispersed in the vehicle and adapted to uniformly and minutely roughen the surface of an applied film of the composition and reduce glare from the film; and
   (C) solid inert noncoalescing crush-resistant particles having an average diameter greater than about 15 microns but less than the average diameter of the hollow microspheres, and present in an amount sufficient to protect a substantial proportion of the hollow microspheres against total crushing under abrasion of the film.
2. A composition of claim 1 in which the hollow microspheres constitute between 10 and 65 volume-percent of the solids in the composition.
3. A composition of claim 1 in which the solid particles are glass microspheres.
4. A composition of claim 1 in which the average diameter of the solid particles is between about one-fourth and three-fourths of the average diameter of the hollow microspheres.

References Cited

UNITED STATES PATENTS

| 2,865,266 | 12/1958 | Wynn | 94—1.5 |
| 3,005,790 | 10/1961 | Wynn et al. | 260—22 |
| 3,202,541 | 8/1965 | Hochberg | 117—161 |
| 3,204,537 | 9/1965 | Searight | 94—1.5 |
| 3,292,507 | 12/1966 | Vanstrum | 94—1.5 |

DONALD E. CZAJA, Primary Examiner

R. W. GRIFFIN, Assistant Examiner

U.S. Cl. X.R.

94—1.5; 106—253; 117—132 R, 132 BE, 161 R, 161 KP, 161 K, 161ZB, 167; 260—37 R, 37 EP, 37 N, 40 R